…

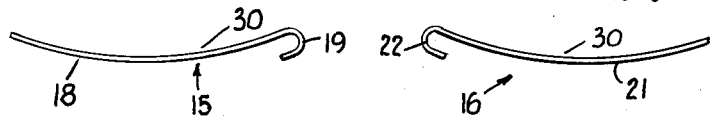
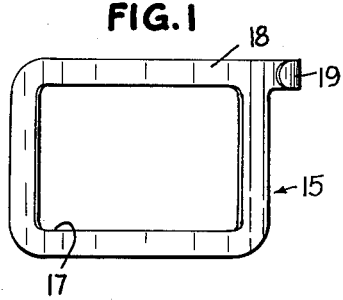
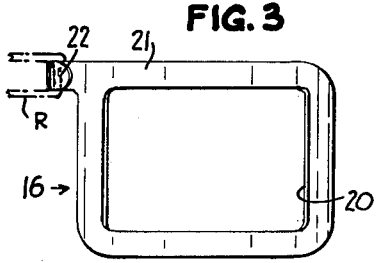
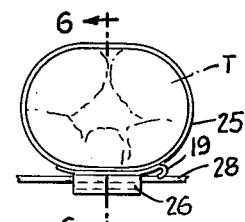
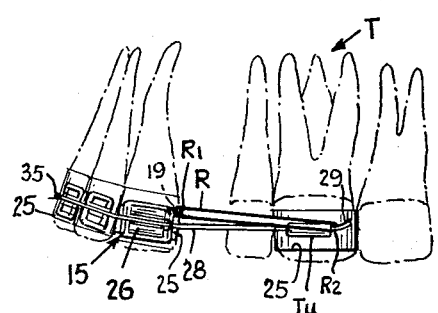
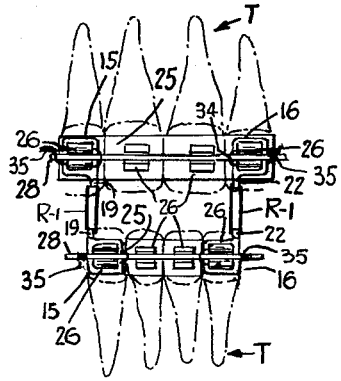
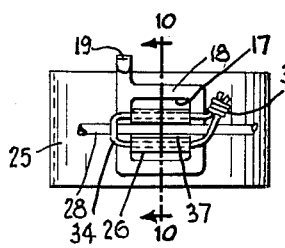

United States Patent Office 3,054,185
Patented Sept. 18, 1962

3,054,185
UNIVERSAL ORTHODONTIC BRACKET HOOK
Irving I. Weinger, 424 Brighton Beach Ave.,
Brooklyn, N.Y.
Filed Jan. 18, 1961, Ser. No. 83,587
5 Claims. (Cl. 32—14)

This invention relates broadly to devices for use by orthodontists, and it is the more specific object of the present invention to provide a universal orthodontic hook which can be secured to any bracketed tooth by an orthodontist in a matter of seconds.

One of the problems confronting an orthodontist is the problem of filling spaces in a patient's mouth. This is done by engaging a tightly fitting elastic band between two spaced-apart teeth which are to be brought closer together. Each of the teeth to be moved must be provided with an orthodontic hook on which the elastic band is secured. At present, the orthodontist must remove the archwire from the patient's mouth, which he had previously painstakingly adjusted, remove the bracketed band from each of the teeth to be made, which had previously been cemented to the tooth, solder or weld a hook on the bracket, re-cement each orthodontic band to the tooth from which it had been removed, and re-insert and reset the archwire. This work takes a great deal of the orthodontist's time and frequently requires more than one appointment.

With this in view, it is the principal object of the present invention to provide a hook which can be secured to any bracketed tooth without the need to remove either the arch wire or the band from the patient's mouth.

It is a further aim of the present invention to provide an orthodontic hook which is adapted for use by an orthodontist regardless of the technique he employs or the type of bracket he prefers.

It is yet another purpose of the present invention to provide an orthodontic hook of this character which can readily be secured to a bracketed tooth by superimposing the hook upon the bracket, positioning the archwire over the body portion of the hook and repositioning the archwire.

And a still further feature of the present invention resides in the provision of an orthodontic hook of this character, which is inexpensive to manufacture and the use of which will save a considerable amount of an orthodontist's time and effort.

These and other meritorious aims and advantages, which will become more fully apparent as the description hereof proceeds, are attained by the novel construction, combination and arrangement of few and simple parts, hereinafter described, and illustrated on the accompanying drawing, constituting a material component of the present disclosure, and in which:

FIGURE 1 is an enlarged front elevational view of an orthodontic hook constructed in accordance with the present invention, the hook portion being on the right hand side.

FIGURE 2 is a top plan view of the hook illustrated in FIGURE 1.

FIGURE 3 is a view similar to FIGURE 1 but showing the hook portion on the left hand side and further showing in dot and dash lines the loop of an elastic band engaged in the hook.

FIGURE 4 is a top plan view of the hook illustrated in FIGURE 3.

FIGURE 5 is a top plan view of a hook of the present invention secured to a bracketed tooth.

FIGURE 6 is a sectional view of the arrangement illustrated in FIG. 5, the section being taken on line 6—6 of FIG. 5.

FIGURE 7 illustrates on an enlarged scale one application of a bracket hook constructed in accordance with the present invention.

FIGURE 8 illustrates on an enlarged scale another application of one orthodontic hook constructed in accordance with the present invention.

FIGURE 9 is a detail view of the manner in which a hook of the present invention is secured to an orthodontic bracket.

FIGURE 10 is a sectional view of an attached hook, the section being taken on line 10—10 of FIGURE 9.

Referring in greater detail to the drawing, the numeral 15 illustrates broadly the embodiment of the present invention in which the hook portion is on the right hand side and the numeral 16 refers broadly to the embodiment of the present invention in which the hook portion is on the left hand side. The orthodontic hook illustrated in FIGURE 1 and broadly referred to by the reference numeral 15 comprises a body portion or frame 18, here illustrated as being substantially rectangular in cross-section, and having rounded corners, the said frame 18 having a central opening 17 therein. At its normally upper right hand corner, frame 18 has a hook 19 formed integrally therewith.

The hook 16 illustrated in FIGURE 3 comprises a frame member or body portion 21 having an opening 20 therein. The normally upper left hand corner of frame member 21 is provided with a hook portion 22 illustrated as being formed integrally therewith. The purpose of hook portions 19 and 22 will presently become more fully apparent. Frame 21 is illustrated as being substantially rectangular in cross-section. FIGURES 2 and 4 illustrate that frame members 18 and 21 are concavo-convexly curved.

The two most frequently occurring instances where bracket hooks are required are illustrated in FIGURES 7 and 8 of the drawing. Orthodontia is that branch of the profession of dentistry which has for its purpose the correction of an improper bite. This is done in several ways as will hereinafter be more fully explained. When an orthodonsist prepares a patent for orthodontic treatment, he takes a plurality of substantially ring-shaped orthodontic bands 25, his skill and by soldering, welding or otherwise, secures an orthodontic bracket as illustrated at 26 or any other suitable and desirable type of bracket, to the normally front area of each band. He then slips each bracketed orthodontic band upon the tooth on which it is required, and cements each bracketed orthodontic band into position as illustrated in FIGURE 8. Each bracket 26 is commonly provided with a normally horizontal recess 27 which constitutes the seat for the archwire 28 which the orthodontist then places in the patient's mouth. The bracket of each molar is provided with a buccal tube TU through which the ends of the archwire emerge and by which the archwire is retained in adjusted position.

The orthodontist frequently advises the extraction of a patient's bicuspids in order that the cuspids may be moved into the spaces provided by the extractions. This necessitates the provision of an orthodontic hook on the bracket of the tooth which is to be moved in which to engage an elastic band in order to effect such tooth movement. An example of the use of an orthodontic hook of the present invention is illustrated in FIG. 7. Inasmuch as tooth movement to the patient's right is here indicated, the orthodontist will use a hook 15 having a right-handed hook portion. Then he loosens the archwire 28 and slip hook 15 over bracket 26 on orthodontic band 25 which has previously been cemented to the cuspid as is illustrated in FIGURE 7.

The archwire 28 is pulled forward very slightly to permit the body member 18 of hook 15 superimposed upon the bracket 26. The archwire is then replaced and a small segment of tie wire 35 is used to secure the archwire in the bracket and simultaneously to retain the body member 18 of hook 15 in adjusted position on the bracket.

Inasmuch as body member 18 is curved as at 30 in FIGURE 2, it will fit snugly on bracket 26. The orthodontist will then engage one loop R1 of an elastic band R in hook portion 19 of body member 18 and he will engage the other loop R2 of elastic band R between the end of the archwire 28 which emerges from the buccal tube TU on the left hand molar T and the buccal tube TU as illustrated in FIGURE 7. In time the cuspid will move into the space provided for it. Obviously, if tooth movement to the left is desired, the orthodontist will use hook 16, the application of both hooks being identical.

When the orthodontist desires to "close" a patient's bite, the orthodontic hooks of the present invention are preferably arranged in the manner illustrated in FIGURE 8. The hooks are slipped upon appropriate orthodontic bands in the patient's mouth and retained in adjusted position in the manner hereabove explained. Two hooks 15 will be pairwise arranged upon the brackets of an appropriate upper and an appropriate lower tooth, the hooks being so turned prior to their adjustment in the patient's mouth that hook portion 19 on the upper tooth will be directed downwardly and the hook portion on the lower tooth will be directed upwardly. Spaced therefrom a pair of hooks 16 are pairwise arranged, one on an appropriate upper tooth and the other on an appropriate lower tooth, the hook elements directed in the direction hereabove explained. The loops of an elastic band R are engaged in the hooks 19 and the loops of another elastic band R are engaged in the hooks 22 as is illustrated in FIGURE 8.

Recess 37, illustrated in FIGURES 9 and 10 of the drawing, is provided for the passage of a tie wire 34. The said tie wire is positioned partly upon and partly behind the frame member 18 or 21 respectively in such manner that the segments of the tie wire which are positioned upon the frame member retain the archwire in the bracket recess and also retain the frame member in adjusted position upon the bracket. The free ends of the tie wire 34 are twisted as at 35 to retain the several elements in adjusted position. Unwinding of the twisted portion of the said tie wire 34 will permit the removal of the tie wire and of the hook member secured thereby.

Since the hooks of the present invention can be made in sizes to fit any of the orthodontic brackets now in use, their application becomes universal. They can also be used regardless of the technique an orthodontist prefers.

There has thus been shown and described a simple yet highly effective orthodontic bracket hook in the best known form of its embodiment and in two of its uses. However, the foregoing disclosure is to be regarded as illustrative and descriptive only of the present invention and not as restrictive or limitative to the exact details shown, applicant reserving the right to make such changes and modifications in the construction of his invention as might come within the scope of the appended claims without thereby departing either from the spirit or the scope of the present invention.

Having thus described the invention, what is claimed as new and desired to secure by Letters Patent, is:

1. A device to facilitate lateral orthodontic tooth movement, said device comprising an archwire, a bracketed tooth-engaging orthodontic band having means formed in the bracket to retain said archwire normally horizontally thereacross, an orthodontic hook, said orthodontic hook positioned between said band and said archwire, and means engaging said hook and said archwire removably retaining said hook in adjusted position.

2. In a device as set forth in claim 1, wherein said orthodontic hook comprises a frame member, said frame member having a hook element thereon, and said frame member positioned between said orthodontic band and the segment of archwire extending thereacross.

3. In a device as set forth in claim 1, wherein said orthodontic hook comprises a frame member, said frame member having a hook formed integrally therewith, and said frame member removably interposed between said bracketed orthodontic band and the segment of archwire extending thereacross.

4. An orthodontic hook comprising a frame member, said frame member adapted to be interposed between a tooth-engaging bracketed orthodontic band and the segment of archwire extending normally horizontally thereacross, said frame member having a hook element thereon, and means adapted to engage said frame member and the archwire removably retaining the archwire and said frame member in their respective positions.

5. An orthodontic hook as set forth in claim 4, wherein said frame member and said hook element are formed integrally.

References Cited in the file of this patent

UNITED STATES PATENTS

| | | |
|---|---|---|
| 385,117 | How | June 26, 1888 |
| 1,019,820 | Millar | Mar. 12, 1912 |
| 1,044,764 | Federspiel | Nov. 19, 1912 |